July 25, 1961 L. B. D'AVIGDOR 2,993,705
ELECTROPNEUMATIC SWAY CONTROL APPARATUS FOR LAND VEHICLES
Filed Aug. 18, 1958 2 Sheets-Sheet 2
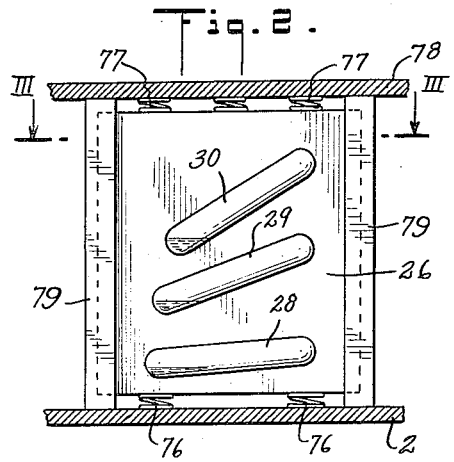
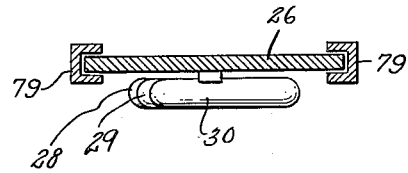
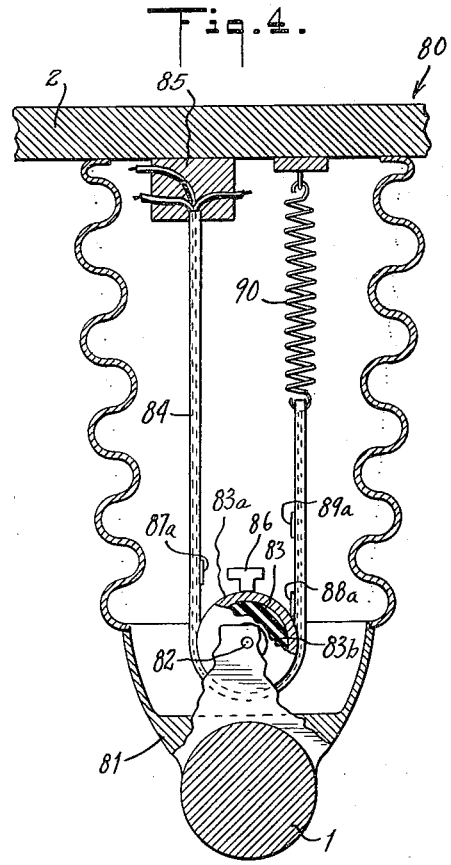
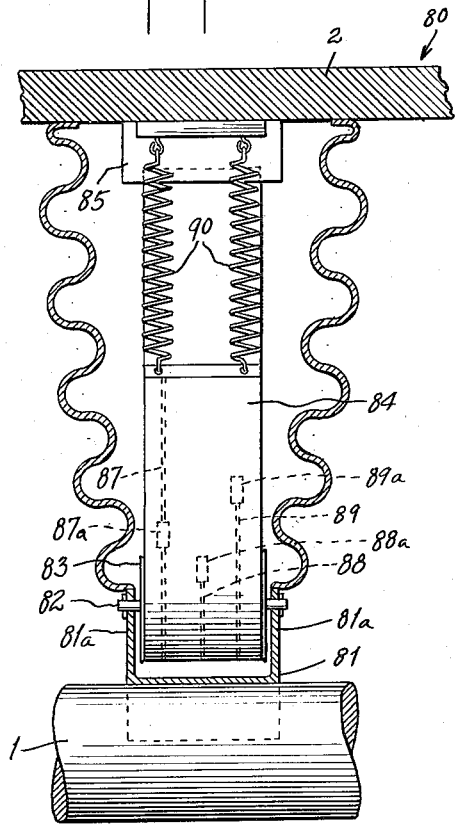
INVENTOR.
LESLIE B. D'AVIGDOR
BY Lester N. Clark
ATTORNEY United States Patent Office 2,993,705
Patented July 25, 1961

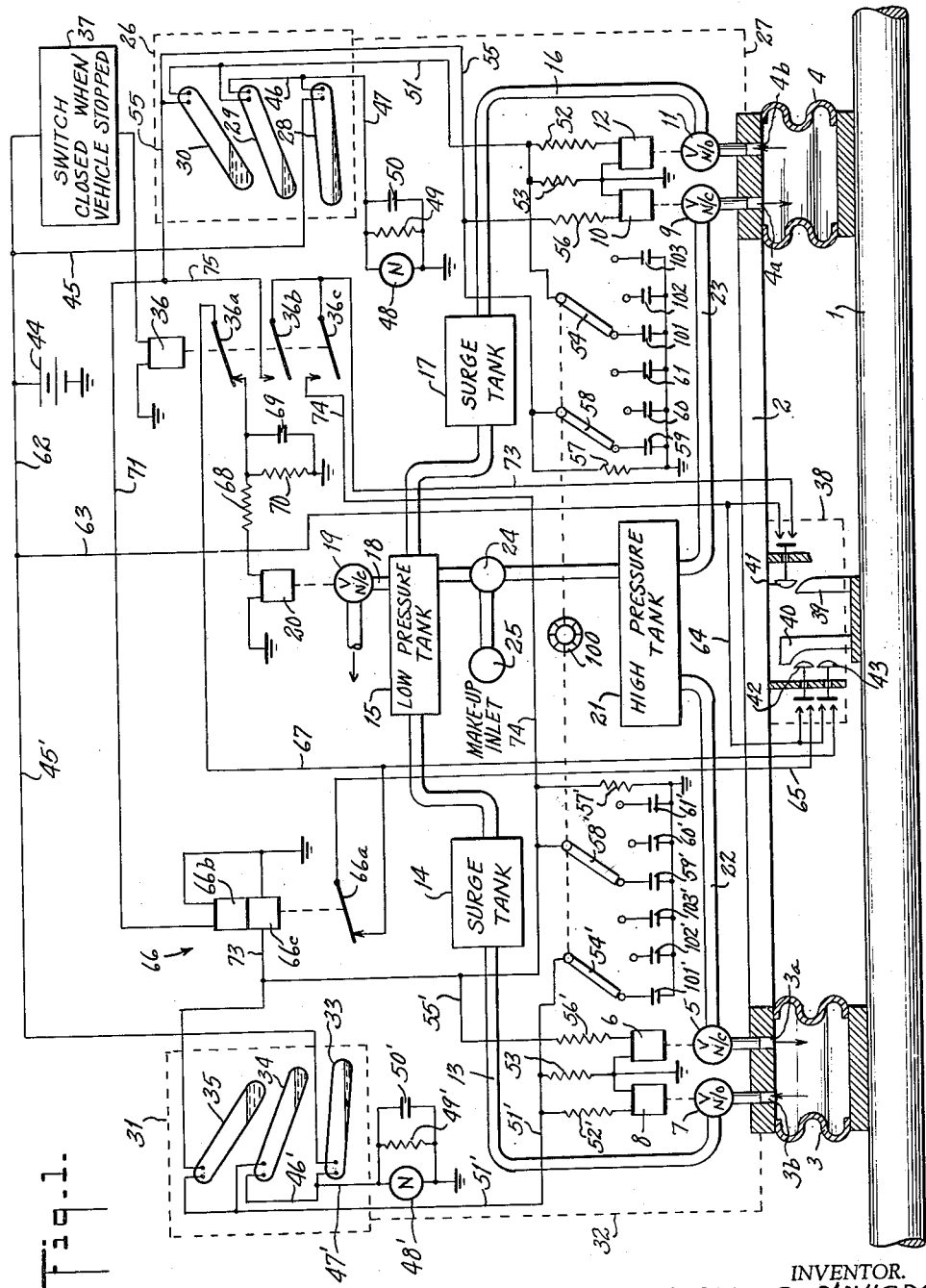

2,993,705
ELECTROPNEUMATIC SWAY CONTROL APPARATUS FOR LAND VEHICLES
Leslie B. d'Avigdor, 63 Wall St., New York, N.Y.
Filed Aug. 18, 1958, Ser. No. 755,546
10 Claims. (Cl. 280—112)

This invention relates to sway control apparatus and is an improvement on the sway control apparatus shown and described in my copending applications Serial No. 514,584, filed June 10, 1955, now Patent No. 2,934,553, granted April 26, 1960, and Serial No. 607,021, filed August 30, 1956.

The said copending applications disclose control apparatus for pneumatic suspension systems by which the body of a vehicle may be maintained level even though the wheels of the vehicle are at different levels. Furthermore, those pneumatic suspension systems may be controlled in response to lateral acceleration such as accompanies motion of a vehicle around a curve, to reduce the lateral tilting action of the vehicle body, or in other words, to prevent the vehicle body from leaning toward the outside of the curve.

In the systems described in both of the copending applications identified above, the primary sensitive element which responds to changes in the vehicle body level and also to lateral acceleration is a mercury switch structure.

It is an object of the present invention to provide an improved control apparatus of the type described, in which the pneumatic suspension system is operated as the vehicle moves around a curve to produce a counter tilt of the vehicle body toward the inside of the curve.

It is a further object to provide a control apparatus of the type described in which the counter tilt is controlled so that the resultant force acting on persons or articles carried by the vehicle, being the vector sum of the lateral acceleration force and the vertical acceleration force due to gravity, acts in a direction substantially perpendicular to the floor of the body of the vehicle, so as to minimize any tendency for the persons or articles to be moved laterally within the vehicle.

A further object is to provide apparatus of the type described in which the counter tilt of the vehicle body is effective to distribute the increased load due to lateral acceleration evenly among the wheels of the vehicle, thereby evenly distributing the force tending to hold the vehicle on the road.

Another object of the present invention is to provide a system of the type described including improved means for eliminating high frequency shocks due to unevenness of the roadway and other causes, so that the control apparatus is not disturbed by such forces.

Another object is to provide an improved system of the type described including means for varying the pressure in the pneumatic suspension system in accordance with the load carried by the vehicle.

A further object is to provide a system of the type described in which the pressure in the pneumatic system is set at one control point during operation of the vehicle and at a different control point when the vehicle is stationary, as during loading and unloading.

Another object is to provide an improved system of the type described in which the system pressure required to compensate for variations in load is established in response to measurement of the spacing between the vehicle body and the axle at a point along the center line of the vehicle.

The foregoing and other objects of the invention are attained in the apparatus described herein, which includes apparatus for controlling a pneumatic suspension system associated with one transverse axle of the vehicle. This suspension system includes two pneumatic motors or expansible chambers, one adjacent each end of the axle and positioned between the axle and vehicle body. Air is supplied to each expansible chamber through a normally closed inlet valve and is discharged therefrom through a normally open outlet valve. These valves are operated by electromagnets controlled by mercury switches. At least two mercury switches are provided for each side of the vehicle. The longitudinal dimension of each switch extends laterally of the vehicle. The two switches are normally open, and are set to close at different angles of tilt of the vehicle with respect to the horizontal. The mercury switches also respond to lateral acceleration, and because of their different angles with the horizontal, will close at different values of lateral acceleration. The switch with the smaller angle of tilt controls the electromagnet for operating the normally open discharge valve and is effective when the vehicle tilts to close that valve. The switch with the greater angle with respect to the horizontal controls the inlet valve electromagnet, and is effective when the switch is closed to open that valve and admit high pressure air to the pneumatic motor.

When the vehicle starts to go around a curve, the lateral acceleration first closes the mercury switch having the lower angle with the horizontal. The discharge valve is thereby closed. As the lateral acceleration increases, the switch having the greater angle with the horizontal is closed, thereby opening the inlet valve and admitting high pressure air to the pneumatic chamber. This tends to expand the chamber and to raise the side of the vehicle on the outside of the curve. This admission of high pressure air to the chamber and the concurrent lifting of the vehicle body continues until the vehicle body is tilted back toward the inside of the curve by an amount such that the counter tilt angle counteracts the effect of the lateral acceleration and breaks the contact in the most highly tilted mercury switch. The angle of counter tilt thereby established for the vehicle body is maintained until the lateral acceleration decreases still further to the extent necessary to open the contacts in the least tilted of the switches. When those contacts are opened, the discharge valve is opened and the air in the pneumatic chamber is discharged to a tank at a predetermined pressure.

Retarding means are provided for slowing the response of the system to the closing of the mercury switches, in order to eliminate any disturbance due to road shocks and the like. One such retarding means comprises a third mercury switch set at a smaller angle to the horizontal than the other two and connected in series with the circuit for supplying electrical energy to the other two switches. This third switch prevents the other two switches from passing current unless the third switch is also closed. Another delay mechanism comprises a time constant circuit connected in parallel with the electromagnets which operate the valves. The time constant of this circuit may be made adjustable so as to make the system less or more sensitive depending upon whether the road encountered is rough or smooth.

A closed air circulating system is preferred because of its advantages with regard to the exclusion of dust, etc. In operation, the pressure in the low pressure section of the closed system tends to increase with each supply of air to the pneumatic motors. Means are provided to vent the closed system whenever the spacing between the axle and the vehicle body exceeds a predetermined value. This value is set for a larger spacing when the vehicle is operating and for a smaller spacing when the vehicle is standing still, as during loading and unloading. Means are also provided, effective when the vehicle is stationary, to maintain the spacing between the body and the axle greater than a predetermined minimum value, by supplying air under pressure to one or the other of the pneumatic motors.

Other objects and advantages of the invention will become apparent from a consideration of the following specification and claims, together with the accompanying drawings.

In the drawings:

FIG. 1 is a wiring diagram of a sway control apparatus embodying the present invention;

FIG. 2 is an elevational view of a mercury switch control utilized in the apparatus of FIG. 1;

FIG. 3 is a cross-sectional view taken along the line III—III of FIG. 2;

FIG. 4 is an elevational view of a preferred form of load compensating switch mechanism which may be used in the system of FIG. 1; and FIG. 5 is an elevational view of the switch mechanism of FIG. 4.

FIG. 1

This figure illustrates diagrammatically a portion of a vehicle equipped with a sway control system constructed in accordance with the present invention. The vehicle has a transverse axle 1 on which is mounted a body including a normally horizontal platform 2. Between the platform 2 and the axle 1 are mounted two expansible chambers, shown as convoluted bellows 3 and 4. The bellows serve as springs for supporting the platform 2 on the axle 1. They may be the only springs supporting the platform 2, or they may be auxiliary to a more conventional type of principal suspension system.

The chamber 3 has an air inlet 3a controlled by a valve 5 which is normally closed, and which may be opened by energization of an electromagnet 6. The chamber 3 also has an air outlet 3b controlled by a valve 7 which is normally open and which may be closed by energization of an electromagnet 8.

The chamber 4 is provided with an inlet 4a, controlled by a valve 9, normally closed, which may be opened by energization of an electromagnet 10. The chamber 4 has an outlet 4b controlled by a valve 11, normally open, which may be closed by energization of an electromagnet 12.

The outlet 3b leads through the valve 7 and a conduit 13 and a surge tank 14 to a low pressure tank 15. The outlet 4b similarly leads through valve 11, a pipe 16, and a surge tank 17 to the low pressure tank 15. The low pressure tank 15 has an outlet 18 controlled by a normally closed valve 19 which may be opened by energization of an electromagnet 20.

When the valves 5, 7, 9, 11 and 19 are in their normal positions, the chambers 3 and 4 are in fluid communication with the low pressure tank 15, and the air in that part of the system is trapped there. Consequently, the pressure in the chambers 3 and 4 is then determined by the load on the platform 2, which tends to compress the chambers 3 and 4 and to increase the pressure therein, and also to decrease the spacing between the platform 2 and the axle 1.

Air under high pressure may be supplied from a tank 21 through a pipe 22 and valve 5 to the inlet 3a of chamber 3. Air may also be supplied from the same tank 21 through a pipe 23 and valve 9 to the inlet 4a of chamber 4. Air at a suitable high pressure is maintained in the tank 21 by a compressor 24 having an inlet connected to the low pressure tank 15 and a make-up inlet 25 open to the atmosphere.

It is desirable to keep the pneumatic system closed insofar as possible in order to avoid the presence of dirt, moisture, and other substances which may be drawn in with the outside air. The makeup inlet 25 must be provided with a suitable filter to prevent those substances from entering the closed system.

Mounted on the right-hand side of the vehicle, above the chamber 4 is a panel 26. A dotted line 27 indicates that panel 26 is supported on the platform 2. On the panel 26 are fixed three mercury switches 28, 29 and 30, each having its left-hand end lower than its right-hand end, and respectively tilted to the horizontal at different angles. For example, the switch 28 may be tilted at one or two degrees to the horizontal, the switch 29 at five degrees and the switch 30 at ten degrees. These particular angles are set forth by way of example only to aid in illustrating the operation of the apparatus. The particular angles to be used in any given system will be determined by the characteristics of the vehicle and the surface on which it is to be used. In any actual structure, these angles may be made adjustable.

The switches 28, 29 and 30 control the electromagnets 10 and 12 through the circuits to be described below in connection with the operation of the system.

A panel 31 is mounted on the left-hand side of the platform 2 as indicated by the dotted line 32. The panel 31 carries three mercury switches 33, 34 and 35, similar to the switches 28, 29 and except that the right-hand ends of the switches 33, 34 and 35 are lower than their respective left-hand ends. The switches 33, 34 and 35 control the energization of electromagnets 6 and 8.

The energization of electromagnet 20 is controlled by a relay 36, in turn controlled by a switch diagrammatically indicated at 37, which is closed when the vehicle is stopped. The switch 37 may be manually controlled by the operator of the vehicle, or it may be made to close automatically when the wheels stop turning, or when a door opens, or in response to some other condition which indicates that the vehicle has changed from a running condition to a loading or unloading condition.

Mounted between the platform 2 and the axle 1 at the longitudinal center line of the vehicle is a spacing control generally indicated by the reference numeral 38. The spacing control 38 includes two operating fingers 39 and 40 fixed on the axle. Finger 39 engages and closes the push button switch 41 whenever the spacing between the axle and the platform 2 becomes smaller than a predetermined distance—the length of the finger 39. The finger 40 engages and operates sequentially a pair of push button switches 42 and 43 as the spacing between the axle 1 and the platform 2 increases. The particular spacings at which the respective switches 42 and 43 close are determined by the length of the finger 40 and by the locations of the switches.

Each of the switches 28, 29, 30, 33, 34 and 35 constitutes a control means responsive to tilting and lateral acceleration of the vehicle in one sense, and movable between a normal (open) position and an active (closed) position in response to a predetermined resultant of tilting and/or lateral acceleration. Broadly speaking, each switch may be replaced by any other equivalent control mechanism.

Operation

The operation will first be described under the conditions of a turn to the left.

As the vehicle turns to the left, the body of the vehicle tends to tilt toward the right under the influence of its own inertia. This tilts the panels 26 and 31 to the right, tending to close the switches 28, 29 and 30. At the same time, the mercury in the switches 28, 29, 30 tends to move toward the right under the influence of inertia. The mercury in switches 33, 34 and 35 also tends to move to the right at this time, but since the mercury is normally at the right-hand ends of those switches, no control effects are there produced.

Since the switch 28 is set at the smallest angle to the horizontal, its mercury pool engages its contacts first. When switch 28 closes, it sets up a circuit which may be traced from the positive terminal of a battery 44 through a wire 45 and the contacts of switch 28 to a wire 46 leading to switch 29. Current also flows through switch 28 and a wire 47 to an indicator lamp 48. A resistor 49 and a capacitor 50 are connected in parallel with the indicator lamp 48.

As the tilting or centrifugal acceleration of the vehicle proceeds further, the switch 29 closes its contacts, thereby completing a circuit for energizing the electromagnet 12. This circuit may be traced from the positive terminal of battery 44, through wire 45, switch 28, wire 46, switch 29, a wire 51, a resistor 52, electromagnet 12 to ground and thence to the grounded terminal of battery 44.

A resistor 53 and one of three capacitors 101, 102, 103, selected by a switch 54, are connected in parallel with the series combination of resistor 52 and electromagnet 12. The capacitors 101, 102, and 103 have progressively different capacitance values.

Energization of electromagnet 12 closes the normally open valve 11, thereby trapping in the chamber 4 the air which was previously present. The chamber 4, instead of being vented to the low pressure tank 15, is now completely closed, so that any tendency of the vehicle body to tilt to the right is resisted by increasing compression within the chamber 4.

As the tilt of the vehicle to the right continues, or acceleration in that direction continues, switch 30 closes its contacts, thereby completing a circuit for energizing electromagnet 10. This circuit may be traced from the positive terminal of battery 44, through wire 45, switch 28, wire 46, switch 29, switch 30, a wire 55, a resistor 56, electromagnet 10 and ground, back to the grounded terminal of battery 44.

A resistor 57 is connected in parallel with the series combination consisting of resistor 56 and electromagnet 10. In parallel with resistor 57 is a selector switch 58 shiftable between three terminals. Three capacitors 59, 60 and 61, having progressively different capacitance values, are connected between ground and the respective terminals of the selector switch 58.

Energization of electromagnet 10 is effective to open the valve 9 and thereby to supply air at high pressure from the tank 21 to the chamber 4. This pressure is sufficiently high so that it is effective to expand that chamber, thereby raising the right-hand side of platform 2 to counteract the tilting effect due to the turning or tilting of the vehicle. This expansion of chamber 4 and the accompanying raising movement of the right-hand side of the vehicle continues as long as the valve 9 remains open, which in turn continues as long as the switch 30 remains closed. Note that the raising of the right-hand side of the vehicle tends to tilt the panel 26 back toward the left so that as the raising of the right-hand side continues, the switch 30 is eventually opened and the counter tilt stops. The body of the vehicle then has reached a position whose angle of lateral tilt is such that the vector sum of the forces acting on the mercury in switch 30, one due to lateral acceleration and one due to gravity, is directed substantially perpendicular to the platform 2, i.e., within a range of error determined by the initial tilt of the switch 30 with respect to the horizontal. The vector sum of forces on any other article or person in the vehicle will be similarly directed. By adjusting the angle of tilt of the switch 30, this range of error may be made as small as desired. A certain positive angle is, of course, necessary in order to make the system operative. However, the angle may readily be made small enough so that persons riding in the vehicle are subjected to no discomfort due to tilting or lateral acceleration.

This counter-tilting action may, and in fact usually does continue after the time when the platform 2 regains a position parallel to the axle 1, so that the body of the vehicle is tilted to the side toward which the vehicle is turning. In other words, the vehicle "leans into" the curve.

Both valves 9 and 11 are now closed and the air in the chamber 4 remains trapped at the increased pressure, until the vehicle completes the traverse of the curve, whereupon the lateral acceleration stops and the mercury in the switch 29 breaks its contacts. This interrupts the circuit through the electromagnet 12, thereby allowing the valve 11 to open and to vent the chamber 4 through the surge tank 17 to the low pressure tank 15. The air compressed within the chamber 4 is then gradually released through the surge tank 17 until the system is back in its normal conditions.

Several means are provided to delay the operation of the electromagnets 10 and 12 so that they will not be actuated by shocks due to roughness of the road or other transient factors which disappear almost immediately. One of these sensitivity decreasing means is the switch 28, which prevents electrical energy from reaching either of the switches 29 and 30 from the battery unless that switch 28 is also tilted by a substantial amount from its normal position. Any transient effect must therefore achieve simultaneous closure of switches 28 and 29 in order to get a current to the electromagnet 10. The capacitors 101, 102, 103 and the shunting resistor 53 also serve to delay the pick up of the electromagnet 12 after energy is applied to it. The capacitor selected by switch 54 must be charged first before a substantial current can flow through the electromagnet 12. The time required to charge it depends upon its capacitance and the resistance of resistor 53.

In a similar fashion, the switch 58 and the capacitors 59, 60 and 61 are utilized to vary the sensitivity of the electromagnet 10 to operation of the switch 30. The operator of the vehicle may select a position for the switches 54 and 58, by operating the control knob 100. If the vehicle is traveling on a very rough road, he would select the least sensitive position. On a smooth road he would select the most sensitive position.

The operation of the system as described above, occurring when the vehicle turns a curve to the left and so is accelerated to the right, takes place similarly upon a tilting of the vehicle to the right, as when the vehicle is traveling on a slanted roadway.

The circuits and time delay mechanism on the left-hand side of the vehicle correspond both in structure and in function to those on the right-hand side of the vehicle. The structural elements in the left-hand side control, other than those specifically described above, have been given primed reference characters similar to the corresponding elements on the right-hand side, and will not be further described.

*Stiffness control*

It should be apparent that, at each actuation of the normally closed inlet valves 5 and 9, air under high pressure is fed to one of the chambers 3 and 4. This high pressure air is later vented to the tank 15. Each operation of the system therefore tends to increase the back pressure on the system and hence the normal pressures in the chambers 3 and 4. Consequently, the platform 2 tends to rise with respect to the axle 1, and the entire springing system tends to become stiffer and less resilient. Means are provided to compensate for this effect to avoid undue stiffness. Furthermore this compensating means is arranged to operate more sensitively when the vehicle is on a straight, level run than when the vehicle is continually turning, as on a twisting road. The operation of the compensating means will first be described as it takes place during a straight, level run.

When the spacing between the axle 1 and the platform 2 has increased to a predetermined distance, the finger 40 engages and closes the twitch 42, thereby completing an energizing circuit for the electromagnet 20. This circuit may be traced from the positive terminal of battery 44 through wires 62, 63 and 64, switch 42, wire 65, back contact 66a of a relay 66, wire 67, back contact 36a of relay 36, a resistor 68, the winding of electromagnet 20 and thence through ground to the grounded terminal of battery 44. A capacitor 69 and a resistor 70 are connected in parallel with the series combination of resistor 68 and electromagnet 20, so as to delay the energization of that electromagnet in response to closure of switch 42. The purpose of the capacitor 69 and resistor 70 is to make the system insensitive to road shocks, as in the case of the similar mechanism described above.

Energization of electromagnet 20 opens the normally closed valve 19, thereby venting the low pressure tank to the atmosphere and maintaining the valve open until the spacing between the platform 2 and axle 1 is reduced sufficiently to allow the switch 42 to open.

When the vehicle is travelling on a twisting road, one or the other of the switches 30 and 35 is likely to be closed. The circuit just described is opened by energization of relay 66 at any time when either of the switches 30 and 35 is closed, so that the vent is not opened at such times. When switch 30 is closed, a circuit for one winding 66b of relay 66 is completed which may be traced from the positive terminal of battery 44, through wire 45, switch 28, wire 46, switch 29, switch 30, wire 71 and winding 66b to ground and thence to the grounded terminal of battery 44.

Similarly, when switch 35 is closed, an energizing circuit for winding 66c of relay 66 is completed. This circuit may be traced from the positive terminal of battery 44 through wires 62 and 45′, switches 33, 34 and 35, a wire 73 and winding 66c to ground and thence through ground to the negative terminal of battery 44.

Consequently, it may be seen that relay 66 has two windings, one of which is energized when either of switches 30 and 35 is closed. Energization of either winding is enough to pick up the contact 66a and open its contacts so that the electromagnet 20 cannot be energized.

The stiffness control system described above increases the stiffness of the suspension system during an interval when the vehicle is traveling on a twisting road, and also prevents completion of the circuit through switch 42 and consequent opening of the vent from the low pressure tank during any turn while either of switches 30 and 35 is activated. Control of electromagnet 20 is then taken over by switch 43 which monitors pressure in the entire system.

When the spacing between the platform 2 and the axle 1 exceeds a second upper limit value greater than the first limit value for which switch 42 is set, then the switch 43 is closed, shunting the contacts 66a in the energizing circuit for the electromagnet 20, thereby venting the low pressure tank 15 regardless of the position of the mercury switches 30 and 35.

During turning conditions, the force applied to the road surface through the vehicle wheels is the sum of the force due to gravity and the centripetal force which is opposing the centrifugal force. This condition calls for a stiffer suspension system than that required when the centripetal component is not present.

Instead of having the relay 66 controlled by switches 30 and 35, as described above, that relay might alternatively be controlled by the switches 29 and 34.

*Loading control*

When the vehicle is standing still, it may be unloaded and then loaded again. In order to prevent unnecessary actuation of the venting system during unloading and loading, the switch 37 is placed in control of a relay 36. Switch 37 is closed, as mentioned above whenever the vehicle is stopped, or whenever a loading or an unloading operation is to take place. Closing of switch 37 completes an obvious energizing circuit for the winding of relay 36. Energization of winding 36 opens contact 36a, thereby breaking the circuit to the electromagnet 20 and preventing actuation of the venting system.

Relay 36 also controls contacts 36b and 36c. The contacts 36b and 36c are connected in parallel with each other and in series with the switch 41. When they are closed, and the spacing between the axle 1 and the platform 2 decreases below a predetermined value, then the switch 41 closes energizing circuits for the electromagnets 6 and 10 to admit high pressure air to both of the chambers 3 and 4, thereby raising the platform 2 to compensate for increased load.

This energizing circuit for electromagnet 6 may be traced from the positive terminal of battery 44 through wires 62 and 63, switch 41, wire 73, contact 36c and wire 74, wire 55′, resistor 56′, electromagnet 6 and thence through ground to the grounded terminal of battery 44. A similar circuit may be traced for electromagnet 10 which proceeds along the circuit last traced to the switch 41 and thence through wire 73, contact 36b, a wire 75, wire 55, resistor 56, electromagnet 10 to ground and thence back to the grounded terminal of battery 44.

FIGS. 2 AND 3

These figures illustrate one form of mount for the panel 26 supporting the mercury switches 28, 29 and 30. As shown in these figures, the panel 26 is supported on coil springs 76, which rest on the platform 2 or other fixed part of the vehicle. Another set of coil springs 77 is retained between the upper edge of the panel 26 and another fixed part 78 of the vehicle body. The sides of the panel 26 are received in channels 79 so that the panel may move freely up and down within the vehicle. By having the panel supported on relatively soft springs, such as springs 76 and 77, many of the minor actuations of the switches which might otherwise take place in response to minor road shocks, may be avoided. The panel 26 is restrained against lateral movement so that it does not move with respect to the vehicle body upon lateral acceleration or tilting of the vehicle. The springs 76 and 77 prevent the panel from being improperly disturbed by sudden movements of the vehicle body in the vertical direction which are typical of driving over rough roads.

FIGS. 4 AND 5

These figures illustrate a modified form of spacing control device, generally indicated by the reference numeral 80. The spacing control device 80 may be substituted for the spacing control device 38 of FIG. 1.

As shown in these figures, there is mounted on the top of the axle 1 a bracket 81 having a pair of spaced arms 81a which serve as bearings for a pivot pin 82 on which is fixed a pulley 83. A flexible belt cable 84 has one end fixed to a terminal block 85 mounted on the under side of the platform 2. The cable 84 passes around the under side of the pulley 83 and thence extends upwardly to a point somewhat above the pulley, where it terminates. That end of cable 84 is connected to the platform 2 by means of coil springs 90, stressed in tension. The outer rim 83a of the pulley 83 is electrically conductive and is mounted on a core 83b of insulating material. A brush 86 rides on the upper surface of the pulley 83 and is connected to the positive terminal of the battery 44. The cable 84 is insulated throughout most of its length. It may have three separate conductors 87, 88 and 89 corresponding to the there switches 41, 42 and 43 of the spacing control 38. Portions of the insulation covering the conductors are removed, providing contacts 87a, 88a and 89a. There is thereby provided a control device including three separate switches which are closed at three separate spacings of the axle 1 and the platform 2. The switches may be provided with suitable electrical connections corresponding to those of the switches 41, 42 and 43.

All the air conveying conduits or pipes in the system should have substantial internal cross-sectional areas, in order that the system may respond quickly to actuation of the mercury switches. While certain delaying mechanisms are deliberately introduced into the system, as described above, those delaying mechanisms are designed to have particular desired effects. It is desirable to avoid other delays, such as might be occasioned by narrow, restricted conduits, and which might have adverse or unpredictable effects on the operation of the system. With that end in view, the piping should be made large, in order to get a quick response from the operation of the valves 5, 7, 9 and 11. The use of large diameter piping will not be objectionably wasteful of air in this system, because the use of air is intermittent and would not be increased by the use of large pipes.

While I have shown and described certain preferred embodiments of my invention, other modifications thereof will readily occur to those skilled in the art, and I therefore intend my invention to be limited only by the appended claims.

I claim:

1. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including a normally closed inlet valve, a normally open outlet valve, means effective when the outlet valve is open to regulate the pressure in the chamber, first and second control means, each responsive to lateral tilting and lateral acceleration of the vehicle in one sense, and each movable between a normal control position and an active control position in response respectively to smaller and larger predetermined resultants of lateral tilting and/or acceleration, first valve operating means actuated by the first control means to close said outlet valve when the first control means moves to its active control position, and second valve operating means actuated by the second control means to open the inlet valve when the second control means moves to its active control position.

2. Sway control apparatus as defined in claim 1, in which said first and second control means are first and second mercury switches mounted on the vehicle body, said first and second switches being tilted, when the vehicle is at rest on a level surface, at smaller and larger angles, respectively, to a horizontal plane.

3. Sway control apparatus as defined in claim 2, including a third mercury switch tilted, when the vehicle is at rest on a level surface, at a smaller angle to the horizontal plane than said first switch, contacts in said third switch closed by tilting the body through said last-mentioned angle, and electric circuit means for controlling said first and second valve operating means, said circuit means including said contacts in series with said first and second valve operating means.

4. Sway control apparatus as defined in claim 2, in which said first and second valve operating means comprise electromagnets, and resistance-capacitance networks connected in parallel with said electromagnets to delay energization of the electromagnets upon closure of the switches so as to render said electromagnets insensitive to road shocks.

5. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including a valve, an electromagnet for operating said valve, electric switch means mounted on the body and controlling the energization of said electromagnet in response to tilting and/or lateral acceleration of the vehicle, and a rigid support member for said switch means, and spring means resiliently supporting said support member on the body for vertical movement relative thereto, to inhibit actuation of the switch means by road shocks.

6. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including a valve, means for operating said valve in response to tilting and/or lateral acceleration of the vehicle, and means responsive to the vertical spacing between the middle of the axle and the vehicle body including selector means operable to set said spacing selectively at either of two separated values, and means effective when the spacing varies from the selected spacing value to vary the fluid pressure in the chamber in a compensating sense.

7. Sway control apparatus as defined in claim 6, in which said selector means responds to substantial lateral acceleration of the vehicle to select the larger of the two spacings and responds to absence of substantial lateral acceleration to select the smaller of the two spacings.

8. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber, including an inlet valve, an electromagnet for operating said valve, an exhaust reservoir of said fluid, an outlet valve connecting said chamber to said reservoir, a second electromagnet for operating the outlet valve, electric switch means mounted on the body and controlling the energization of said electromagnets in response to tilting and/or lateral acceleration of the vehicle, means for varying the pressure of the fluid in the reservoir, and means responsive to the weight of the load carried by the vehicle body for controlling said pressure varying means to vary the pressure of the fluid in the reservoir in proportion to the weight of the load.

9. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including an inlet valve, an electromagnet for operating said valve, an exhaust reservoir of said fluid, an outlet valve connecting said chamber to said reservoir a second electromagnet for operating the outlet valve, electric switch means mounted on the body and controlling the energization of said electromagnets in response to tilting and/or lateral acceleration of the vehicle, means for varying the pressure of the fluid in the reservoir, and means responsive to the total force acting downwardly on the axle through the suspension means for controlling said pressure varying means to vary the pressure of the fluid in the reservoir in proportion to said total force.

10. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including an inlet valve, means for controlling said valve, an exhaust reservoir of said fluid, an outlet valve connecting said chamber to said reservoir, means for controlling the outlet valve, means for varying the pressure of the fluid in the reservoir, and means responsive to the total force acting downwardly on the axle through the suspension means for controlling the pressure varying means to vary the pressure of the fluid in the reservoir in proportion to said total force.

References Cited in the file of this patent

UNITED STATES PATENTS

| 2,623,758 | Cruz | Dec. 30, 1952 |
| 2,670,201 | Rossman | Feb. 23, 1954 |
| 2,684,254 | Goss | July 20, 1954 |
| 2,778,656 | May | Jan. 22, 1957 |
| 2,824,752 | Schwartz | Feb. 25, 1958 |
| 2,849,242 | Allison | Aug. 26, 1958 |
| 2,860,889 | Hanna | Nov. 18, 1958 |
| 2,922,634 | Shedd | Jan. 26, 1960 |